(12) United States Patent
Tissot

(10) Patent No.: US 10,572,022 B2
(45) Date of Patent: Feb. 25, 2020

(54) CONTROL DEVICE WITH SENSORY FEEDBACK

(71) Applicant: DAV, Créteil (FR)

(72) Inventor: Jean-Marc Tissot, Creteil (FR)

(73) Assignee: DAV, Créteil (FR)

( * ) Notice: Subject to any disclaimer, the term of this patent is extended or adjusted under 35 U.S.C. 154(b) by 416 days.

(21) Appl. No.: 15/102,930

(22) PCT Filed: Dec. 10, 2014

(86) PCT No.: PCT/FR2014/000269
§ 371 (c)(1),
(2) Date: Jun. 9, 2016

(87) PCT Pub. No.: WO2015/086919
PCT Pub. Date: Jun. 18, 2018

(65) Prior Publication Data
US 2016/0357264 A1 Dec. 8, 2016

(30) Foreign Application Priority Data
Dec. 11, 2013 (FR) ..................... 13 02907

(51) Int. Cl.
G09G 5/00 (2006.01)
G06F 3/041 (2006.01)
(Continued)

(52) U.S. Cl.
CPC ......... *G06F 3/017* (2013.01); *B60H 1/00742* (2013.01); *B60H 1/00871* (2013.01);
(Continued)

(58) Field of Classification Search
CPC ........ G06F 3/017; G06F 3/0304; G06F 3/016; G06F 3/011
See application file for complete search history.

(56) References Cited

U.S. PATENT DOCUMENTS 3,469,837 A 9/1969 Heilig
3,628,829 A * 12/1971 Heilig ..................... A47C 1/12
297/180.14
(Continued)

FOREIGN PATENT DOCUMENTS

EP 2 523 069 A2 11/2012
EP 2 639 672 A2 9/2013
(Continued)

OTHER PUBLICATIONS

International Search Report issued in PCT/FR2014/000269 dated Sep. 7, 2015 (3 pages).
(Continued)

*Primary Examiner* — Nan-Ying Yang
(74) *Attorney, Agent, or Firm* — Osha Liang LLP

(57) ABSTRACT

The invention relates to a control device with sensory feedback (1) comprising: a detector (11) of gestures of the hand (9) of a user (3), a sensory feedback unit (15) connected to the gesture detector (11) and providing sensory feedback to the user (3) in accordance with the gestures of the user's hand (9), characterised in that the sensory feedback unit (15) includes a unit (17) for blowing a stream of air towards an area (19) for detecting gestures of the hand (9) of the user (3).

14 Claims, 3 Drawing Sheets

Figure 1:
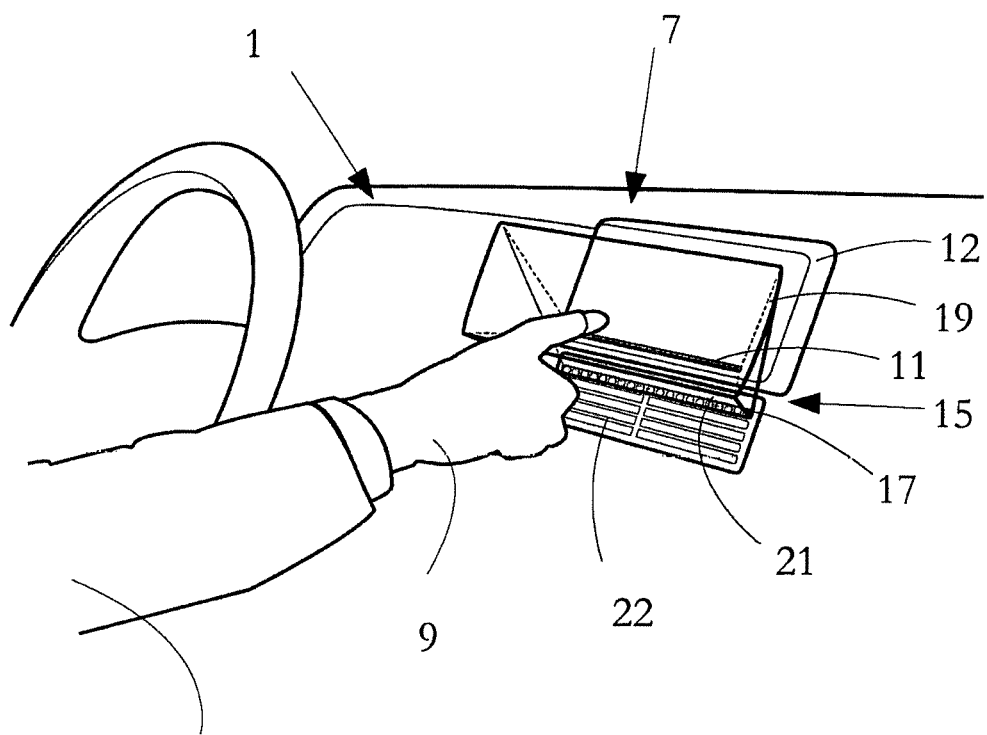

(51) Int. Cl.
  *G06F 3/045* (2006.01)
  *G06F 3/01* (2006.01)
  *B60K 37/06* (2006.01)
  *B60H 1/00* (2006.01)
  *B60K 35/00* (2006.01)

(52) U.S. Cl.
  CPC ............ B60K 35/00 (2013.01); B60K 37/06 (2013.01); G06F 3/016 (2013.01); G06F 3/041 (2013.01); *B60K 2370/1438* (2019.05); *B60K 2370/158* (2019.05)

(56) References Cited

U.S. PATENT DOCUMENTS

| | | | | |
|---|---|---|---|---|
| 2005/0217481 | A1* | 10/2005 | Dunne | B01D 53/06 95/113 |
| 2007/0055214 | A1* | 3/2007 | Gilbert | A61M 5/30 604/500 |
| 2009/0219252 | A1* | 9/2009 | Jarventie | G06F 3/04886 345/173 |
| 2010/0302015 | A1* | 12/2010 | Kipman | G06F 3/011 340/407.1 |
| 2013/0100008 | A1* | 4/2013 | Marti | G06F 3/011 345/156 |
| 2013/0261871 | A1* | 10/2013 | Hobbs | B60K 37/06 701/28 |
| 2014/0267049 | A1* | 9/2014 | Durham | G06F 3/0235 345/168 |

FOREIGN PATENT DOCUMENTS

| | | |
|---|---|---|
| EP | 2 647 919 A1 | 10/2013 |
| WO | 2011/093873 A1 | 8/2011 |

OTHER PUBLICATIONS

Written Opinion of the International Searching Authority issued in PCT/FR2014/000269 dated Sep. 7, 2015 (6 pages).

\* cited by examiner

CONTROL DEVICE WITH SENSORY FEEDBACK

The present invention concerns a control device with sensory feedback notably for motor vehicles.

Nowadays vehicles are equipped with numerous controls for controlling the various systems of a vehicle such as, for example, among others, the audio system, the air conditioning system, the navigation system.

Blind controls have been extensively developed for these systems, such as, for example, tactile controls, installed on the center console of the vehicle, for example.

However, for the user to be informed of action on a command, haptic feedback units have been added to the tactile control devices. Accordingly, when a command is acted on, the tactile surface vibrates, therefore signaling to the user that a command has been acted on. The user can therefore execute a command blind, i.e. without taking their eyes off the road, and with full awareness of the commands executed and in complete safety.

More recently, control devices including a gesture sensor have been offered for controlling various systems of a vehicle.

Most often this involves a video camera, ultrasound sensors or laser sensors directed toward the interior of the passenger compartment in a detection area situated in front of the dashboard and more or less at the level of the center console.

In this case, when the user makes a predefined gesture in the detection area, the latter gesture, when it is recognized, leads to a command to one of the systems of the vehicle, for example to increase or decrease the volume of the audio system, to increase or decrease the temperature in the passenger compartment, etc.

A control device using gesture sensing is described in the document EP 2 639 672, for example.

However, even if this gesture can be executed blind, the user cannot be very certain that their gesture, and therefore their command, has been acted on.

Sensory feedback has been proposed in the form of an audible or visual signal emitted when a gesture is recognized and leads to a command in order to inform the user, for example as in the document EP 2 523 069 A2 relating to a gaming console.

However, this control device with sensory feedback for a gaming console is not suitable for control in a motor vehicle because it requires the attention of its user whereas the user of a motor vehicle must give priority to focusing their attention on events occurring in front of the vehicle.

Moreover, an audible signal of this kind may be a nuisance if the driver has their audio system turned on, for example to listen to a radio broadcast or a piece of music.

Similarly a visual signal, generally a blinking diode, necessitates the driver to remove their attention from the road, which is not acceptable.

One object of the present invention is therefore to propose a control device with sensory feedback that makes it possible to provide the driver with a sure indication of recognition of a gesture without them having to take their attention away from the road.

Another object, which is independent of the first and may complement the latter, is to enable the driver to place their hand in the detection area blind.

To this end, the invention consists in a control device with sensory feedback including:
a detector of gestures of the hand of a user,
a sensory feedback unit connected to the gesture detector and providing sensory feedback to the user in accordance with the gestures of their hand,
characterized in that the sensory feedback unit includes a unit for blowing a stream of air toward an area for detecting gestures of the hand of the user.

The control device may further have one or more of the following features, separately or in combination:

For example, the unit for blowing a stream of air is configured to deliver a stream of air when the hand of the user is located in and/or enters the gesture detection area.

The stream of air delivered by the blower unit may have a temperature different from that of the air around the user.

For temperature control in a motor vehicle passenger compartment the temperature of the stream of air delivered by the blower unit may increase for a command increasing the temperature and decrease for a command decreasing the temperature.

In accordance with one aspect, the stream of air delivered by the blower unit is pulsed.

The pulse frequency of the stream of air delivered by the blower unit may be a function of proximal and distal distances of the hand in the detection area.

In accordance with a variant, the blower unit is configured to deliver a pulse pattern to notify the user of action on a command.

In accordance with another aspect, the blower unit is configured to deliver a stream of moist or moistened air.

In accordance with one embodiment, the blower unit includes a set of nozzles delimiting the gesture detection area.

In this case, the nozzles may be aligned in a row or the nozzles may be arranged in a bidimensional matrix.

In accordance with another aspect, the blower unit is configured to deliver jets of air the intensity of which corresponds to a predefined profile.

It may therefore be configured to deliver jets of air of lower intensity at the periphery of the gesture detection area and of greater intensity toward the center of the gesture detection area.

The invention also concerns a motor vehicle dashboard characterized in that it includes a control device with sensory feedback as defined above.

Figure 2:
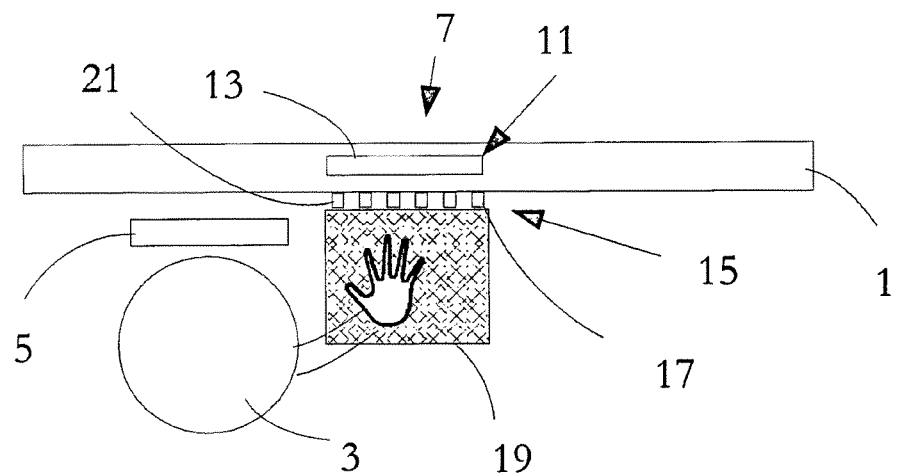
Figure 3:
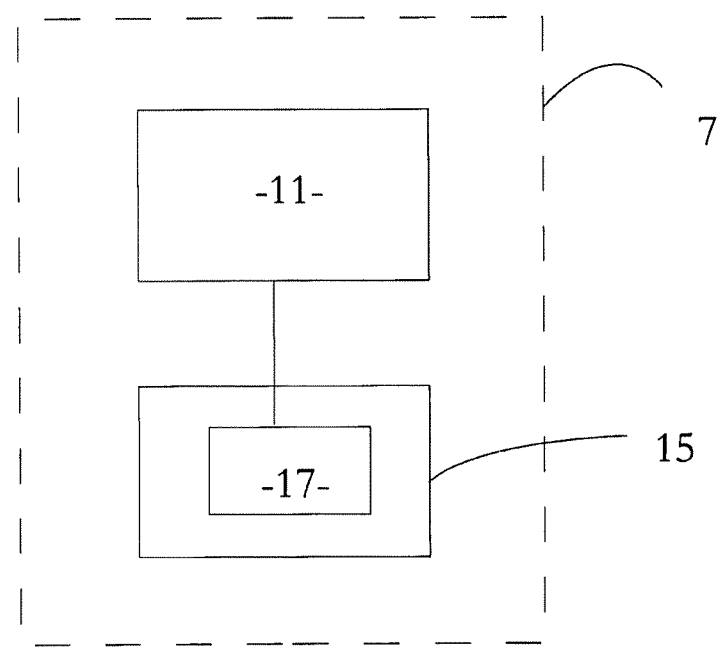
Figure 4:
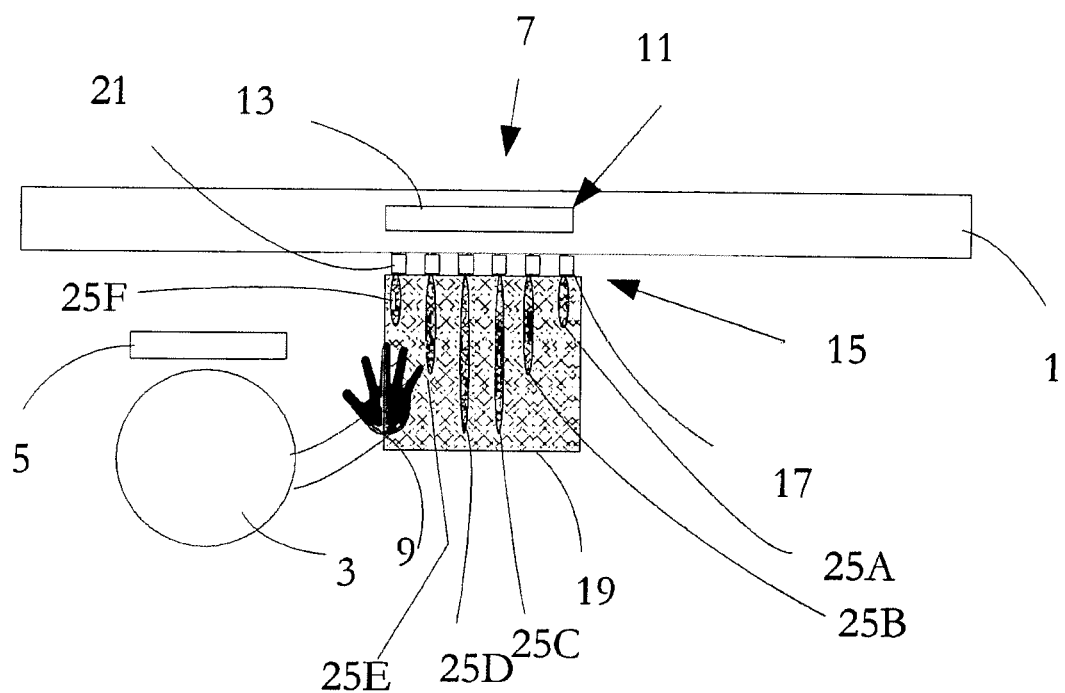

Other advantages and features will become apparent on reading the description of the invention and from the appended drawings, in which:

FIG. 1 is a perspective view of a motor vehicle passenger compartment equipped with a control device in accordance with the invention, FIG. 2 is a diagrammatic plan view of a control device produced in accordance with one embodiment, FIG. 3 is a block diagram of the control device from FIG. 1, and FIG. 4 is a diagrammatic view similar to FIG. 2 of a variant of the invention.

In these figures, the identical elements bear the same reference numbers.

One example of one embodiment of a control device in accordance with the invention will be described with reference to FIGS. 1 to 3.

In FIG. 1 is represented a partial view of a passenger compartment equipped with a dashboard 1.

A user/driver 3 is seated in front of their steering wheel 5 and wishes to execute a command blind using the control device 7 with sensory feedback in accordance with the invention by making a gesture with their hand 9.

To this end, the control device 7 with sensory feedback includes on the one hand a detector 11 of gestures of the hand 9 of the user 3 that is integrated into the dashboard 1, for example, below a display screen 12.

The gesture detector 11 includes, for example, an ultrasound unit 13, a laser device or a video camera able to identify particular gestures of the hand 9 to translate them into a command addressed to one of the systems of the vehicle such as, for example, moving the hand 9 toward the dashboard 1 to reduce the volume or the temperature in the passenger compartment or then to pull back the hand 9 to increase or raise the temperature in the passenger compartment.

Of course, other commands may be envisaged, for example commands for a navigation or other system.

Also other locations of the gesture sensor may be envisaged such as, for example, a video camera integrated into the rear-view mirror.

Moreover, the control device 7 with sensory feedback includes a sensory feedback unit 15 connected to the gesture detector 11 and supplying sensory feedback to the user 3 as a function of the gestures of their hand 9.

This sensory feedback unit 15 includes a unit 17 for blowing a stream of air toward a detection area 19 (represented shaded; see also FIG. 2) of gestures of the hand 9 of the user 3. When the unit 17 for blowing a stream of air functions, for example as a function of a gesture that has been executed and recognized by the gesture detector 11, the user 3 feels the stream of air on their hand 9.

Thus the user 3 of the vehicle has easily perceptible sensory feedback that does not necessitate taking their attention away from the road and that is not startling.

In fact, the entry into action of the unit 17 for blowing a stream of air will be perceived as entirely natural.

As shown in FIGS. 1 and 2, the blower unit 17 includes a set of nozzles 21 delimiting the area 19 for detecting gestures of the user 3.

In accordance with the FIG. 1 example, the nozzles 21 are integrated into the dashboard 1, for example just above ventilation outlets 22 of the passenger compartment and arranged in a row.

This makes it easy to integrate the sensory feedback unit 15 into the dashboard 1 of a motor vehicle.

In accordance with a more sophisticated variant that is not shown, the nozzles are arranged in a bidimensional matrix.

A bidimensional configuration increases the sensory feedback possibilities to practically guide and accompany the hand 9 of the user 3 into the detection area 19.

Moreover, the unit 17 for blowing a stream of air is configured to supply a stream of air when the hand 9 of the user 3 enters and/or is located in the area 19 for detecting gestures and/or in its vicinity.

That is to say that, when the user 3 wishes to make a command gesture, they direct their hand 9 toward the detection area 19. When the gesture detector 11 detects that the hand 9 is entering and/or located in the detection area 19, the unit 17 begins to supply a stream of air, thereby signaling to the user 3 on the one hand that the hand 3 is positioned at the correct location to detect a command gesture and on the other hand that the device 1 is ready to detect a gesture.

As a result of this the driver can easily locate the detection area 19 blind to execute a command therein.

In order for the user to distinguish better the stream emanating from the nozzles 21 of the blower unit 17, the stream of air supplied by the blower unit 17 may have a temperature different from that of the air surrounding the user 3. The temperature difference between the air in the passenger compartment and the air from the blower unit 17 may be from 5° to 10° C., for example. This temperature difference enables the user 3 to perceive the stream of air better.

Of course, the temperature may be higher or lower than that of the surrounding air in the passenger compartment. To this end, it is possible to couple the nozzles 21 via particular ducts to the air conditioning system of the vehicle to receive heated or cooled air.

In accordance with another variant, a heating element is positioned on the downstream side of the nozzles 21 to heat the air.

To produce a perception of a cool stream of air, there may also be envisaged charging the stream of air with moisture that will be deposited on the hand of the user and give the impression of a cooler stream of air when that moisture evaporates on the hand 9 of the user.

In accordance with a particular variant suitable for temperature control in a motor vehicle passenger compartment, the temperature of the stream of air leaving the blower unit 17 is adjusted so as to increase this temperature of the flow of air for a command to raise the temperature and to reduce it for a command to lower the temperature.

The user 3 will not only have sensory feedback that their control gesture has been acted on, but at the same time information on the degree/intensity of their command. The user 3 can therefore easily command the raising or the lowering of the temperature in the passenger compartment.

In accordance with another variant, the blower unit 17 is equipped with a pulsing unit to deliver a pulsed stream of air.

Pulsing the air also improves perception of the stream of air associated with the sensory feedback. Moreover, pulsing the stream of air makes it possible to reduce the total flow rate of the stream of air whilst maintaining effective sensory feedback.

In accordance with an equivalent sensation of sensory feedback, it is also found that the pulsed stream of air will be less audible than a continuous stream, which also adds to the comfort of the passengers in the passenger compartment.

Moreover, the pulsing unit enables adjustment of the pulsation frequency of the stream of air.

Accordingly, to provide the user not only with feedback on the fact that their command has been acted on but also to what degree, the pulsation frequency of the stream of air is for example a function of proximal and distal distances relative to the gesture detector 11 of the hand 9 in the detection area 19.

Not only is the stream of air well perceived, but also it further contains information on the measure, the degree of control itself or on the position of the hand 9 in the detection area 19.

Alternatively, the blower unit 17 may be configured to deliver a pulsation pattern to notify the user of the taking account of a command, for example three air pulses followed by a pause followed by a further three air pulses.

The pulsation pattern acts as a code that the user can easily recognize and facilitates the use of the gesture detector 11.

In FIG. 4 is represented another variant of the invention that applies particularly well when a plurality of nozzles 21 is disposed in a row, for example, or a bidimensional configuration.

In this case, the blower unit 17 is configured to deliver jets of air the intensity of which corresponds to a predefined profile. A kind of relief can therefore be produced that can be felt by the user 3.

In accordance with the FIG. 4 example, the blower unit is for example configured to deliver jets of air of lower intensity at the periphery of the gesture detection area 19 and higher intensity toward the center of the gesture detection area 19.

This is diagrammatically represented in FIG. 4 which shows various jets 25 A-F. The intensity of the various jets is represented by their lengths. Thus the peripheral jets 25A and 25F are of lower intensity than the intermediate jets 25B and 25E and the jets 25C and 25D that are at the center of the gesture detection area 19 are the most intense.

This can be done either for a continuous blowing mode or for a pulsed blowing mode.

This variant is of interest because it imparts a multidimensional geometry to the stream of air, particularly advantageous to impart a relief concept to the gesture detection area 19.

In accordance with a more sophisticated version, the blowing intensity profile may correspond to the relief of control buttons or icons and their position displayed on the screen 12.

It is therefore clear that the device 1 in accordance with the invention enables effective sensory feedback for a user 3, notably a motor vehicle driver without the latter having to take their attention away from the road in front of them.

The invention claimed is:

1. A control device with sensory feedback comprising:
a detector of gestures of a hand of a user;
a sensory feedback unit connected to the detector of gestures and providing sensory feedback to the user in accordance with the gestures of their hand;
wherein the sensory feedback unit includes a unit for blowing a stream of air with a greater intensity towards a center of a gesture detection area for guiding the hand of the user to the center of the gesture detection area for detecting the gestures of the hand of the user.

2. The device as claimed in claim 1, wherein the unit for blowing a stream of air is configured to deliver a stream of air when the hand of the user is located in and/or enters the gesture detection area.

3. The device as claimed in claim 1, wherein the stream of air delivered by the blower unit has a temperature different from that of the air around the user.

4. The device as claimed in claim 3, for a temperature control of a motor vehicle passenger compartment, wherein the temperature of the stream of air delivered by the blower unit increases for a temperature increasing command and decreases for a temperature decreasing command.

5. The device as claimed in claim 1, wherein the stream of air delivered by the blower unit is pulsed.

6. The device as claimed in claim 5, wherein the pulse frequency of the stream of air delivered by the blower unit is a function of proximal and distal distances of the hand in the gesture detection area.

7. The device as claimed in claim 5, wherein the blower unit is configured to deliver a pulse pattern to notify the user of action on a command.

8. The device as claimed in claim 1, wherein the blower unit is configured to deliver a stream of moist or moistened air.

9. The device as claimed in claim 1, wherein the blower unit includes a set of nozzles delimiting the gesture detection area.

10. The device as claimed in claim 9, wherein the nozzles are aligned in a row.

11. The device as claimed in claim 9, wherein the nozzles are arranged in a bidimensional matrix.

12. The device as claimed in claim 10, wherein the blower unit is configured to deliver jets of air, the intensity of which corresponds to a predefined profile.

13. The device as claimed in claim 12, wherein the blower unit is configured to deliver jets of air of lower intensity at the periphery of the gesture detection area and of greater intensity toward the center of the gesture detection area.

14. A motor vehicle dashboard, comprising a control device with sensory feedback according to claim 1.

* * * * *